United States Patent [19] … [11] Patent Number: 5,000,586
Daxer et al. … [45] Date of Patent: Mar. 19, 1991

[54] SLIDING BEARING

[75] Inventors: Georg Daxer; Joao C. Salamani; Manfred Kaufmann, Jr.; Durval Duarte, Jr., all of Sao Paulo, Brazil

[73] Assignee: Metal Leve S.A. Industria E. Commercio, Sao Paulo, Brazil

[21] Appl. No.: 547,379

[22] Filed: Jul. 3, 1990

Related U.S. Application Data

[63] Continuation of Ser. No. 314,639, Feb. 23, 1989, abandoned.

[30] Foreign Application Priority Data

Feb. 23, 1988 [BR] Brazil .................... PI88008/6[U]

[51] Int. Cl.$^5$ .................................... F16C 33/24
[52] U.S. Cl. ........................ 384/283; 384/282
[58] Field of Search ............. 384/276, 282–285, 384/291–293

[56] References Cited

U.S. PATENT DOCUMENTS

| | | | |
|---|---|---|---|
| 1,260,996 | 3/1918 | Ebel | 384/283 |
| 2,757,055 | 7/1956 | Davis | 384/284 |
| 2,971,248 | 2/1961 | Kingsley et al. | 29/149.5 S |
| 4,400,099 | 8/1983 | Ehrentraut | 384/283 |

FOREIGN PATENT DOCUMENTS

| | | | |
|---|---|---|---|
| 589534 | 12/1933 | Fed. Rep. of Germany | 384/284 |
| 3621577 | 2/1987 | Fed. Rep. of Germany | 384/282 |
| 808407 | 2/1937 | France | 384/284 |
| 524128 | 7/1940 | United Kingdom . | |

Primary Examiner—Thomas R. Hannon
Attorney, Agent, or Firm—Darby & Darby

[57] ABSTRACT

A sliding bearing of the type comprising a backing layer; an intermediate layer provided with internal peripheral grooved portions crosswise the bearing length and longitudinally spaced from each other; optionally, a diffusion or bonding layer on the grooved portions; and a sliding layer of a material softer than the material of the intermediate layer and filling the grooved portions. According to the invention, the grooves of the grooved portions have a depth and longitudinal spacing with uniform or variable dimensions, wherein at least one of the characteristics of depth and spacing is mandatorily variable. This design allows a selective distribution of harder material and softer material on defined portions of the bearing as a function of specific operating requirements.

6 Claims, 6 Drawing Sheets

SLIDING BEARING

This is a continuation of application Ser. No. 314,639, filed Feb. 23, 1989, now abandoned.

The present invention relates to bearings for internal combustion engines, particularly to multilayer bearings for high loads, especially for diesel engines.

Internal combustion engine bearings are subjected to mechanical loads generated by the pressure of combustion gases on the piston top, which are transmitted to the bearings by means of the connecting rods. These bearings must have a number of properties: resistance to wear caused by friction resistance to fatigue caused by cyclic loading, embeddability of foreign particles in the engine oil, and conformability to compensate for shaft misaligaments.

Due to such variety of properties, sliding bearings must be made of different materials for a suitable performance. One well-known type of bearing is the so-called multilayer bearing made up of a backing plate, generally of steel or aluminum, at least one intermediate layer, generally an aluminum alloy or copper-based alloy, and a bearing, or sliding, layer, generally a copper-tin-lead alloy. A diffusion or bonding layer may be present between the bearing layer and the intermediate layer. It is known, however, that in certain applications, where subjected to extremely high loads and friction, such as in current diesel engines, these bearings often have a relatively short service life, for the material of the sliding layer, while suitable to reduce the friction between the shaft and bearing, has not the resistance to wear and fatigue of a harder material. On the other hand, a harder material on the sliding layer would cause excessive friction and an eventual seizure of the shaft.

With a view to solve these problems, it has been proposed to provide sliding bearings with grooves filled with softer material, so as to alternate harder material and softer material in the sliding layer, aiming at better properties of resistance to wear and fatigue.

The concept of grooved bearings is quite old. One of the first descriptions of this solution is disclosed in British patent specification No. 524,128 of July 30, 1940. U.S. Pat. Nos. 2,757,055 of July 31, 1956; 2,971,248 of Feb. 14, 1961, and more recently, U.S. Pat. No. 4,400,099 of Aug. 23, 1983, also disclose grooved bearings for use in internal combustion engines. Save for particular details of each of the designs described and illustrated in said patent papers, all of them have in common a sliding layer alternating harder material and softer material. Another basic feature of these bearings is that the grooves on the harder material have uniform depth and spacing between grooves.

While representing an improvement over conventional plain bearings for certain applications, the aforesaid proposals do not take into account some characteristics of specific engine designs and, accordingly, bearing performance requirements. In other words, the provision of grooves with uniform depth and spacing defines an even distribution of harder material and softer material, thereby importing uniform properties to the bearing regardless of particular requirements of every region of the bearing.

Therefore, it is the purpose of the present invention to provide a multilayer plain bearing wherein the intermediate layer is provided with grooves crosswise the bearing length and filled with a material which is softer than the material of the intermediate layer.

Accordingly, it is the object of the present invention to provide a multilayer plain bearing having an intermediate layer with grooves formed therein and filled with a bearing or sliding material, wherein a selective distribution of harder material and softer material on selected areas of the bearing is provided as a function of specific bearing operating requirements.

The aforesaid object is attained by the provision of internal peripheral grooved portions crosswise the bearing length, longitudinally spaced apart from one another and whose characteristics of depth and longitudinal spacing are defined by any one variable and uniform condition, wherein at least one of said characteristics is mandatorily variable. This design enables basically a more proper dimensioning of the sliding layer on the bearing portions more subjected to high loads and shaft misalignments. It also offers a more uniform distribution of pressures on these bearing portions.

The invention will be fully appreciated from the following description and with reference to the appended drawing where:

Figure 1:
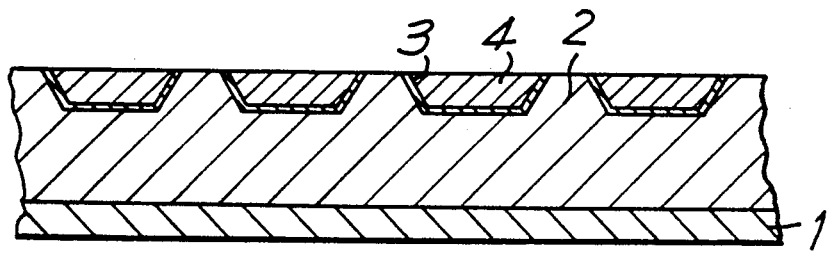
FIGS. 1, 2 and 3 are longitudinal cross sections of plain bearings provided with grooves of varied shapes and arranged with uniform spacing.
Figure 2:
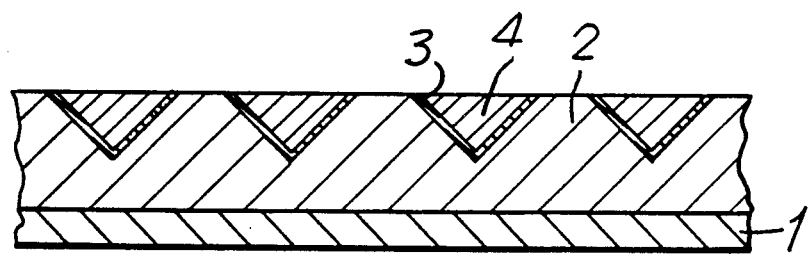
Figure 3:
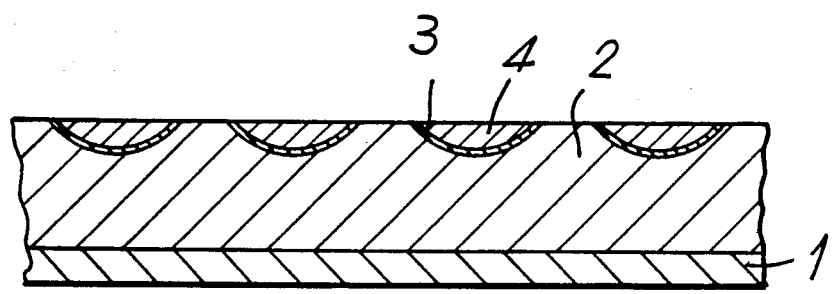

FIGS. 1, 2 and 3 illustrate three different configurations of grooved bearings of the known type, made up of one backing layer (1), one intermediate layer (2) provided with grooves, one diffusion or bonding layer (3), and a bearing or sliding material (4) filling the grooves of the intermediate layer (2). In this type of bearing, the depth of the grooves and the spacing between grooves are uniform, thereby imparting uniform properties to the bearing.

Figure 4:
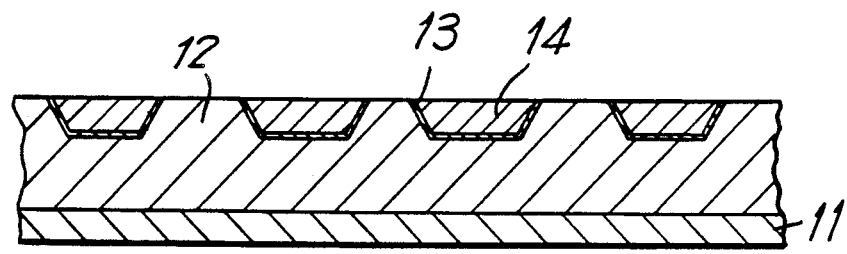
FIG. 4 is a longitudinal cross section of a multilayer plain bearing provided with grooves having uniform depth and variable spacing between grooves.
Figure 5:
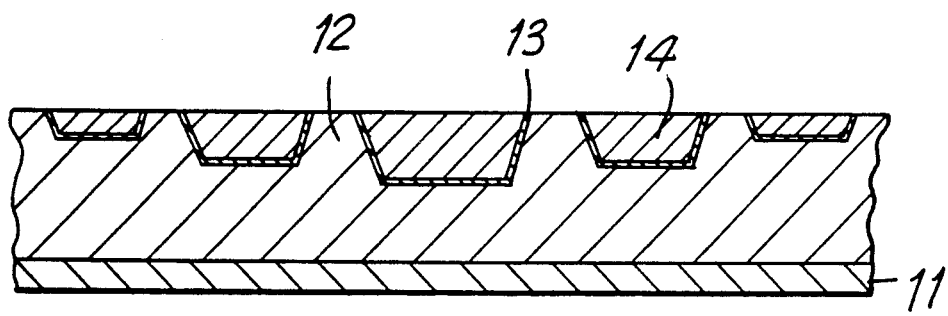
FIG. 5 is a longitudinal cross section of a multilayer plain bearing provided with grooves of variable depths and uniform spacing between grooves.
Figure 6:
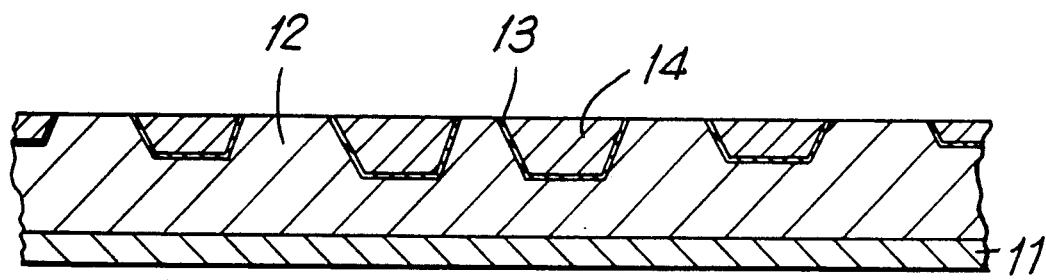
FIG. 6 is a longitudinal cross section of a multilayer plain bearing provided with grooves of variable depths and variable spacing between grooves.

The bearing of the present invention is shown in FIGS. 4, 5 and 6. In these figures, on the backing layer (11) is deposited the intermediate layer (12) provided with grooves filled with sliding material (14). A diffusion or bonding layer (13) may be deposited between the intermediate layer (12) and the sliding material (14). In the embodiment depicted on FIG. 4, the intermediate layer grooves have uniform depth, but the spacing between grooves is variable. In the embodiment illustrated in FIG. 5, the depth of the grooves is variable and the spacing between grooves is uniform. In the embodiment of FIG. 6, the depth of the grooves and the spacing between grooves are both variable. The selection of one of these characteristcs or a combination of two or of the three embodiments is a function of specific requirements of the bearing. For instance, on a bearing subjected to high loads it is recommended to provide a higher amount of softer material, i.e., sliding material, on the most loaded portion of the bearing. The same holds true in respect of those portions of the bearing which must compensate for shaft misalignments.

Figure 7:
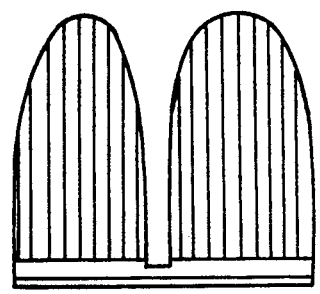
FIG. 7 and 7a are graphs showing the effects of grooves on the peak pressure on the bearing.
Figure 7A:
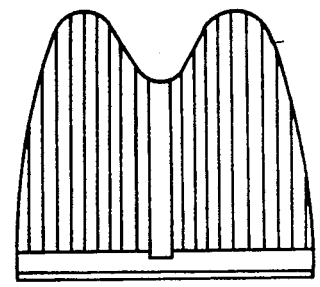
Figure 8:
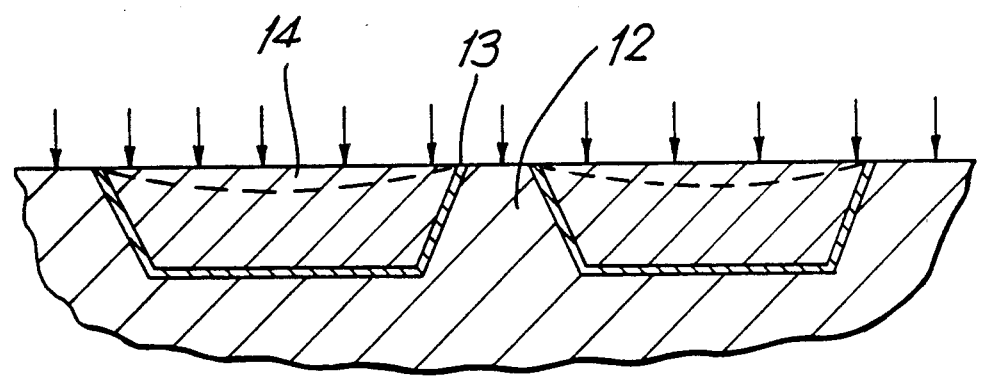
FIG. 8 is a schematic view showing the deformation, under load, of the material filling the grooves.

The pressure along the longitudinal cross section of the bearing defines a parabolic variation. The insertion of a groove on the bearing causes a change to the pressure profile. If the depth of the groove is greater than the diametral clearance, i.e., the clearance between the shaft and the bearing, the pressure profile is changed as shown in the sketch of FIG. 7. In such a case, at the same time that a pressure valley would be obtained owing to the insertion of a groove, two pressure peaks even higher than the original peak would be created. However, if the depth of the groove is lower than the oil film between the shaft and the bearing, the resulting profile will change as indicated in FIG. 7a. Thus, the provision of grooves with suitable depths and spacing as a function of specific pressure values allows a more uniform distribution of pressures on the most loaded portions of the bearing, with a flattening of the oil film peak pressure arising out of the effect of induced elastic deformation of the sliding material (FIG. 8).

Figure 9:
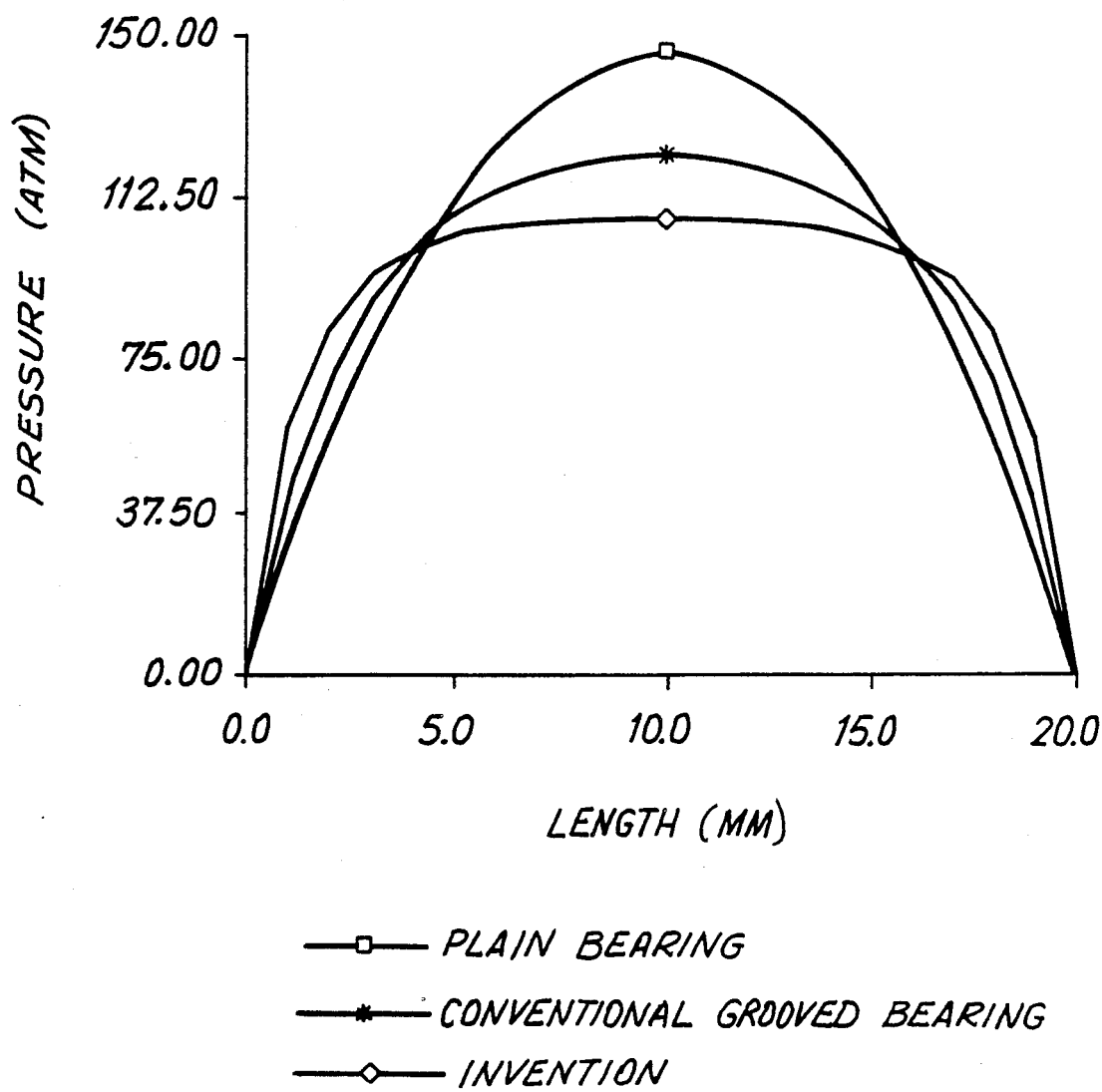
FIG. 9 is a comparative graph of the distribution of pressure on a conventional plain bearing, without grooves, on a known grooved bearing and on the bearing object of the present invention.

The graph in FIG. 9 depicts the distribution of pressure on a plain bearing without grooves, on a conventional grooved bearing and on grooved bearing according to the present invention.

Figure 10:
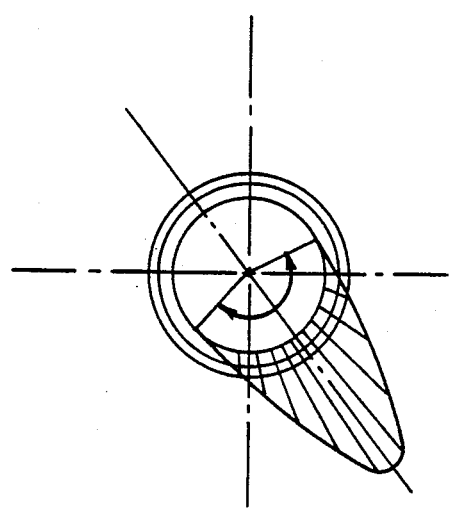
FIG. 10 is a schematic view of the load included angle of the pressure region of a conventional plain bearing or a bearing having uniformly spaced apart grooves.
Figure 10A:
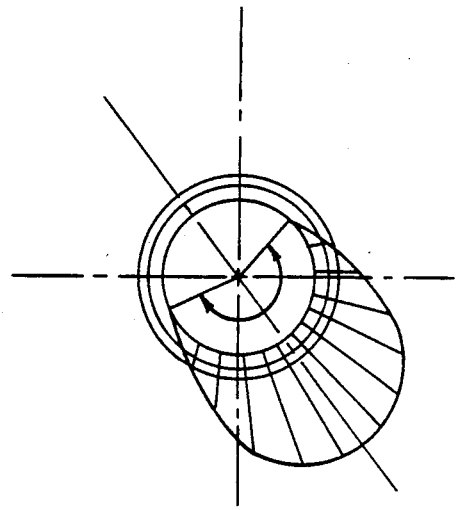
FIG. 10a is a schematic view of the included angle of the pressure region of a plain bearing with grooves having variable depths and spacings.

The concept of the invention offers also a greater included angle of the pressure region (FIG. 10a) as compared with the included angle on a conventional grooved bearing (FIG. 10), thereby reducing the cavitation region.

Another important advantage is related to lubrication: the distribution with a flattening of the pressure peak leads to an increase of the modulus of the pressure derivate in respect of the bearing edges, thus giving rise to a greater flow of lubricating oil, thereby reducing oil temperature and maintaining its viscosity higher.

Figure 12:
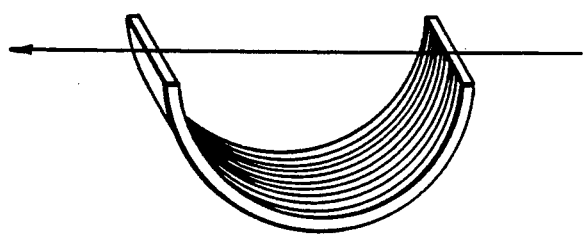
FIG. 12 is a perspective view of the plain bearing of the present invention provided with grooves along all of its circumferential length.
Figure 13:
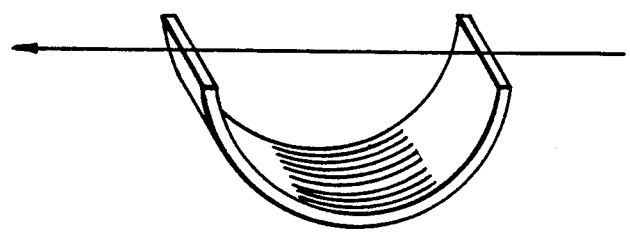
FIG. 13 is a perspective view of the plain bearing of the present invention provided with grooves only on part of its circumferential length.

The provision of grooves according to the present invention may cover all or a part of the peripheral surface of the bearing, as shown in FIG. 12 and 13, respectively. For instance, for certain applications it may be adequate to provide grooves only on defined portions of the bearing, while on the other regions if is important to maintain a conventional structure in order to meet certain requirements.

Figure 11:
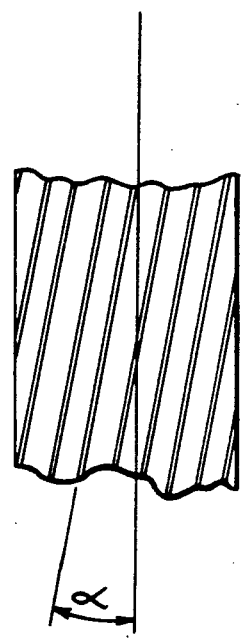
FIG. 11 shows the thread angle of the grooves in relation to the bearing transversal axis.

The grooves are helical in the direction of the bearing axis and must be arranged according to an angle ranging from 0° to 45°, as shown in FIG. 11. It is desirable that this angle be as close as possible to zero. It should be noted that an angle in excess to certain values can be detrimental to the sliding layer in operation such as, for instance, wiping out of sliding material from the grooves.

We claim:

1. An elongated sliding bearing, said bearing comprising a backing layer, an intermediate layer at least three on the backing layer at least three, internal grooves formed in at least a portion of said intermediate layer, said grooves being oriented crosswise to the bearing length and a spacing separating adjacent grooves from each other by a distance in the direction of the bearing length, a sliding layer filling said grooves, said sliding layer being softer than said intermediate layer, said grooves having depth and length, said depths of all of said grooves being equal, said spacing between adjacent grooves being different in distance from said spacing of another pair of adjacent grooves, the groove depth and distribution of groove spacing being selected to correspond with the distribution of load anticipated on the bearing.

2. A sliding bearing according to claim 1, wherein the bearing is tubular, at least some of said grooves extend for less than a full circumference of said tube.

3. A sliding bearing according to claim 1, wherein the grooves are arranged at an angle ranging from 0° to 45° in relation to a radial direction which is at a right angle to the bearing length.

4. A sliding bearing according to claim 1, and further comprising a diffusion or bonding layer on the surfaces of said grooves said diffusion or bonding layer being positioned between said intermediate layer and said sliding layer.

5. An elongated sliding bearing, said bearing comprising a backing layer, an intermediate layer on the backing layer at least three, internal grooves formed in at least a portion of said intermediate layer, said grooves being oriented crosswise to the bearing length and a spacing separating adjacent grooves from each other by a distance in the direction of the bearing length, a sliding layer filling said grooves, said sliding layer being softer than said intermediate layer, said grooves having depth and length, said groove depths differing among said grooves, said spacings between adjacent grooves being of equal distance and, the distributions of groove spacing and groove depth being selected to correspond with the distribution of load anticipated on the bearing.

6. An elongated sliding bearing, said bearing comprising a backing layer, at least three internal grooves formed in at least a portion of said intermediate layer, said grooves being oriented crosswise to the bearing length and a spacing separating adjacent grooves from each other by a distance in the direction of the bearing length, a sliding layer filling said grooves, said sliding layer being softer than said intermediate layer, said grooves having depth and length, said groove depths differing among said grooves, said spacing between one pair of adjacent grooves being different in distance from said spacing of another pair of adjacent grooves, the groove depth and distribution of groove spacing being selected to correspond with the distribution of load anticipated on the bearing.

* * * * *

UNITED STATES PATENT AND TRADEMARK OFFICE
CERTIFICATE OF CORRECTION

PATENT NO. : 5,000,586

DATED : March 19, 1991

INVENTOR(S) : Georg Daxer et al

It is certified that error appears in the above-identified patent and that said Letters Patent is hereby corrected as shown below:

On title page, item [73]

delete "Metal Leve S. A. Industria E. Commercio" and substitute therefor --METAL LEVE S.A. INDÚSTRIA E COMÉRCIO--.

Signed and Sealed this

Twenty-seventh Day of September, 1994

Attest:

BRUCE LEHMAN

Attesting Officer     Commissioner of Patents and Trademarks